United States Patent Office 3,353,949
Patented Nov. 21, 1967

3,353,949
METHOD FOR PREVENTING THE SEGREGATION OF MIXED FERTILIZER
Harold Henry Nau, Trenton, N.J., assignor to American Cyanamid Company, Stamford, Conn., a corporation of Connecticut
No Drawing. Filed July 6, 1964, Ser. No. 380,680
9 Claims. (Cl. 71—64)

ABSTRACT OF THE DISCLOSURE

This invention relates to an improved process for preparing a granular mixed fertilizer containing uniformly distributed, finely divided secondary nutrients or micro nutrients or both on granular primary fertilizer materials. A binder selected from the group consisting of water soluble sugars, alkali metal lignin sulfonates, and water soluble fertilizers causes adhesion of the said nutrients to granular fertilizer, whereby segregation is prevented.

---

The present invention relates to an improved process for preparing a granular mixed fertilizer. More particularly, it relates to a novel procedure for preparing a mixed granular fertilizer containing uniformly distributed, finely divided secondary nutrients or micro nutrients or both on granular primary fertilizer materials.

In many parts of the world including the United States, cropped lands have gradually become deficient in elements essential for adequate plant growth. Other than the major elements: nitrogen, phosphorus and potassium, which are readily supplied to soil by commercially available primary fertilizers, micro nutrients and secondary nutrients constituting such elements as copper, manganese, zinc, boron, iron, molybdenum, calcium, magnesium and sulfur have been found to be lacking in many soils and fertilizers. Such element deficiencies result in reduced crop yields, since optimum growth requires the presence in soils of all the aforementioned elements.

To provide all the essential elements to soil, agronomists have recommended that relatively small amounts of either micro nutrients or secondary nutrients or both be incorporated with primary fertilizers. Unfortunately, a satisfactory method for mixing either micro or secondary nutrients or both in finely divided form with a primary granular fertilizer consisting of nitrogen, phosphorus and potassium has not heretofore been entirely successful. A major difficulty in mixing granular fertilizer materials resides in the segregation of particles of different sizes. It is of prime import to match the particle-size distribution in the overall fertilizer materials to avoid segregation and to insure uniform distribution of micro nutrients and secondary nutrients. However, the particle size of the micro and secondary nutrient particles added to the primary fertilizer particles are usually smaller by nature or by design than are the latter particles. Hence, since there exists a marked difference in size, a serious problem is presented.

Several solutions have been suggested. One procedure is to effect granulation of a fertilizer mixture with particles of micro and secondary nutrients added during processing. However, materials used in mixing or bulk blending are already granulated before delivery and no opportunity exists to further granulate the materials without undue cost. Another method which is equally unsatisfactory is the use of either water or oil to moisten the primary fertilizer granules so as to obtain uniform adhesion of finely divided micro or secondary nutrients on granulated fertilizer. Attempts to so prepare uniformly occluded particles of finely divided nutrients on a primary fertilizer using either oil or water during the bulk-blending operation are not satisfactory. It was found that ready separation of such nutrients from resultant particles occurred, leading to non-uniformity of nutrient particle distribution.

It is, therefore, a principal object of the present invention to provide a novel procedure for supplying finely-divided micro nutrients and secondary nutrients to a primary fertilizer in which substantial segregation does not take place. It is a further object of the invention to provide a straightforward procedure for bulk-blending a primary fertilizer with essential soil supplements utilizing a hereinbelow well-defined class of additives or conditioners in aqueous phase during the bulk-blending operation to obtain fertilizer particles containing nonsegregated, uniformly distributed, finely divided micro nutrients or secondary nutrient additives or both. It is a still further object of the invention to provide a premium primary fertilizer which contains all the essential elements necessary for proper plant growth which is not likely to injure a crop due to the lack of uniform distribution of finely divided nutrients to the granular fertilizer. Further objects and advantages will become apparent from a consideration of the ensuing disclosure.

To this end, a granular fertilizer is treated with a liquid conditioner which permits ready occlusion thereon of finely divided micro nutrient and secondary nutrient additives. Preferably, the primary fertilizer is initially admixed with the finely divided micro nutrient or secondary nutrient materials to which the liquid conditioner is later added. The liquid conditioner, if desired, may be added initially to the primary fertilizer.

In general, from about 1% to about 15% of the aforementioned nutrient material, based on the overall weight of the fertilizer composition, is provided. However, the micro nutrient or secondary nutrient or both, in order to readily adhere to the primary fertilizer particles, must be present in a finely divided state, usually passing a $-160$ mesh screen and, preferably, between a $-200$ mesh to a $-400$ mesh screen. The primary fertilizer usually passes through a $-5$ to $+20$ mesh screen, although a small percentage of fines, usually between 5% and 10%, passes through a $-50$ to $-75$ mesh screen.

Advantageously, a small amount, approximating 5% or less, of an aqueous primary fertilizer conditioning solution containing from about 30% to about 70%, by weight of the conditioner, is added as by spraying or mechanical admixture to the primary fertilizer-nutrient mixture to achieve hitherto unobtainable integration or non-separation of the nutrient particles. Uniform distribution of nutrient particles enhances the primary fertilizer when integration of such particles to the extent of at least 85% occurs as a result of the process of the invention.

Illustrative of the conditioner additives are: water soluble fertilizers, such as urea, ammonium nitrate and mixtures thereof; water soluble sugars, such as glucose, dextrose and black strap molasses; and alkali metal lignin sulfonates, such as sodium lignin sulfonates and equivalents thereof. The conditioner is usually prepared as a 30% to 70% aqueous solution and, preferably, as a 50% solution. A good practice is to employ from about 1% to about 10% of the conditioning solution, based on the combined weight of the primary fertilizer and the finely divided secondary nutrients or micro nutrients or both.

In general, individual secondary and micro nutrient components are commercially available in the form of their soluble salts of metals or metal oxides. Various mixtures of micro nutrient components are also commercially available in either completely water soluble or partially water soluble forms. Exemplary secondary nutrients are: calcium, magnesium and sulfur and illustrative micro nutrients are: copper, boron, zinc, manganese, iron and molybdenum.

Advantageously, any primary fertilizer in granular form can be employed in the process of the invention. Various and diverse fertilizers are available commercially. Such are, for instance, granular diammonium phosphate, granular triple superphosphate, granular potash, granular ammonium sulfate, prilled ammonium nitrate and prilled urea and mixtures thereof. These materials have in common an average particle size range of between about −5 mesh and +20 mesh in which a small amount of fines, generally not more than about 10%, will pass through a −50 to −75 mesh screen.

It is an advantage of the present invention that uniform distribution of the micro nutrients and secondary nutrients in the bulk-blended fertilizer can be obtained by mixing the finely divided nutrients with a primary fertilizer material followed by introduction of the hereinabove defined conditioning solution. Alternatively, the primary fertilizer can be admixed with conditioning solution prior to the introduction of the finely divided micro and secondary nutrients.

The following examples illustrate but are not intended to be limitative of the invention. Unless otherwise specified the parts are by weight.

Example 1

A 6.5–26–26 "starter" fertilizer, 95% of which passes through a 6 mesh Tyler screen and retained on a 16 mesh Tyler screen containing less than 1%–50 mesh fines, was made by blending together 724 parts of granular diammonium phosphate, 408 parts of granular triple superphosphate, and 868 parts of granular potassium chloride. To this mixture was added 20 parts of a commercial micro nutrient mixture known as FTE 504 containing copper, iron, manganese, zinc, and boron. The micro nutrient mixture had been ground to −400 mesh. The materials were then mixed in a cement mixer for one minute. The mixture, while being agitated, was next sprayed with 20 parts of a 50% aqueous solution of ammonium nitrate for an additional minute. The mass was further agitated for one minute longer prior to its discharge from the mixer.

The resultant mixture was examined for adhesion of the micro nutrient additive utilizing a vibrating 60 mesh screening device known as a Ro-Tap. Exposure is for one minute. It is found that only about 5% of the nutrient material was separated by this screening. Integration or adhesion was, therefore, 95%.

Example 2

Following the procedure of Example 1 in every respect, 24.5 parts of a micro nutrient mixture comprising:

| | Parts |
|---|---|
| ZnO | 560 |
| MnO | 756 |
| Na₂B₄O₇·4H₂O | 684 | were added to the primary fertilizer and sprayed with 20 parts of a 50% aqueous ammonium nitrate solution. After mixing, the fertilizer material was permitted to stand for 24 hours and then screened, 85% integration or adhesion was achieved.

Example 3

Following the procedure of Example 2 in every detail except that a 50% aqueous solution of black strap molasses is substituted for ammonium nitrate, the primary fertilizer material was sprayed with 20 parts of black strap molasses. Twenty-four hours after treatment, the material was screened and 90% adhesion was achieved.

Example 4

Repeating Example 2 in every detail except that 20 parts of sodium lignin sulfonate solution containing 50% solids are substituted for the ammonium nitrate solution. By so proceeding, 92% adhesion is achieved in the resultant fertilizer product.

Example 5

Following the procedure of Example 2, but substituting 20 parts of a 50% solution of reducing sugars obtained as a by product of dextrose refining and known commercially as Enzose E–081, 89% adhesion of the micro nutrient in resultant fertilizer was achieved.

Example 6

To three 100 part portions of a 6.5–26–26 fertilizer made of granular diammonium phosphate, granular triple superphosphate and granular potash were added 1, 4 and 8 parts, respectively, of ZnO as a finely divided powder. The samples were mixed and were sprayed wtih 1%, 2% and 8%, respectively, of a 50% ammonium nitrate solution. Retention of micro nutrient, after standing for 24 hours, was 91%, 98%, and 99% when the material was screened on a 60 mesh Ro-Tap for 1 minute.

Example 7

Following the procedure of Example 6 but employing 1%, 3% and 4% of a 50% aqueous urea solution, retentions of 98%, 98% and 99%, respectively, were observed.

Example 8

To 100 parts of prilled urea fertilizer were added 5 parts flowers of sulfur as the secondary nutrient in a suitable mixer. The mixture was sprayed, while mixing, with 3 parts of a 50% urea solution containing 0.1% of sodium dioctylsulfosuccinate wetting agent. Retention was approximately 100%.

Example 9

2270 parts of granular diammonium phosphate were charged into a blender, and the latter sprayed, while mixing, with 25 parts of a solution prepared by dissolving 100 parts of ammonium nitrate in 100 parts of water. Immediately after the solution was added, 25.8 parts of −100 mesh ZnO as the micro nutrient was added. Mixing was continued for 1 to 2 minutes. Result mixture was then discharged from the blender.

Screening on a Ro-Tap for one minute on a 60 mesh screen removed fine material equivalent to about 10% of the ZnO added. Thus, 90% adhesion of a uniformly distributed nutrient on a granular fertilizer is observed.

I claim:

1. A method for preparing a granular primary fertilizer having micro and secondary nutrients uniformly distributed on the surface of said primary fertilizer which comprises the steps of: providing a solids mixture comprising from about 1% to 15% of a finely-divided nutrient material passing through a −100 mesh to −400 mesh screen and selected from the group consisting of micro nutrients, secondary nutrients and mixtures thereof and from about 99% to about 85% of a primary granular fertilizer passing through a −5 to about a +20 mesh screen, applying to said solids mixture a liquid conditioner comprising from about 30% to 70% of a material selected from the group consisting of water-soluble sugars, alkali metal lignin sulfonates and water-soluble fertilizers and the balance of said conditioner being water, said liquid conditioner being present in the range of from 1% to 10%, based on the weight of said solids mixture comprising primary fertilizer and nutrient, and, thereafter, mixing the overall resultant mixture until adhesion of said nutrient materials on the primary fertilizer is attained to the extent of at least 85%.

2. The method according to claim 1 in which the liquid conditioner contains ammonium nitrate.

3. The method according to claim 1 in which the liquid conditioner contains urea.

4. The method according to claim 1 in which the liquid conditioner contains sodium lignin sulfonate.

5. The method according to claim 1 in which the liquid conditioner contains black strap molasses.

6. The method according to claim 1 in which the liquid conditioner contains glucose.

7. The method according to claim 1 in which the liquid conditioner contains dextrose.

8. The method according to claim 1 wherein the nutrient material passes through a −200 mesh to −400 mesh screen.

9. A process according to claim 1 wherein the liquid conditioner is applied to the surface of the primary granular fertilizer prior to the addition of the finely-divided nutrient materials to said fertilizer.

References Cited

UNITED STATES PATENTS

| | | | |
|---|---|---|---|
| 2,280,451 | 4/1912 | Riddle | 71—64 X |
| 2,639,225 | 5/1953 | Venuto | 23—31 |
| 2,850,403 | 9/1958 | Day | 106—307 |

DONALL H. SYLVESTER, *Primary Examiner.*

T. D. KILEY, *Assistant Examiner.*